Figure 1:
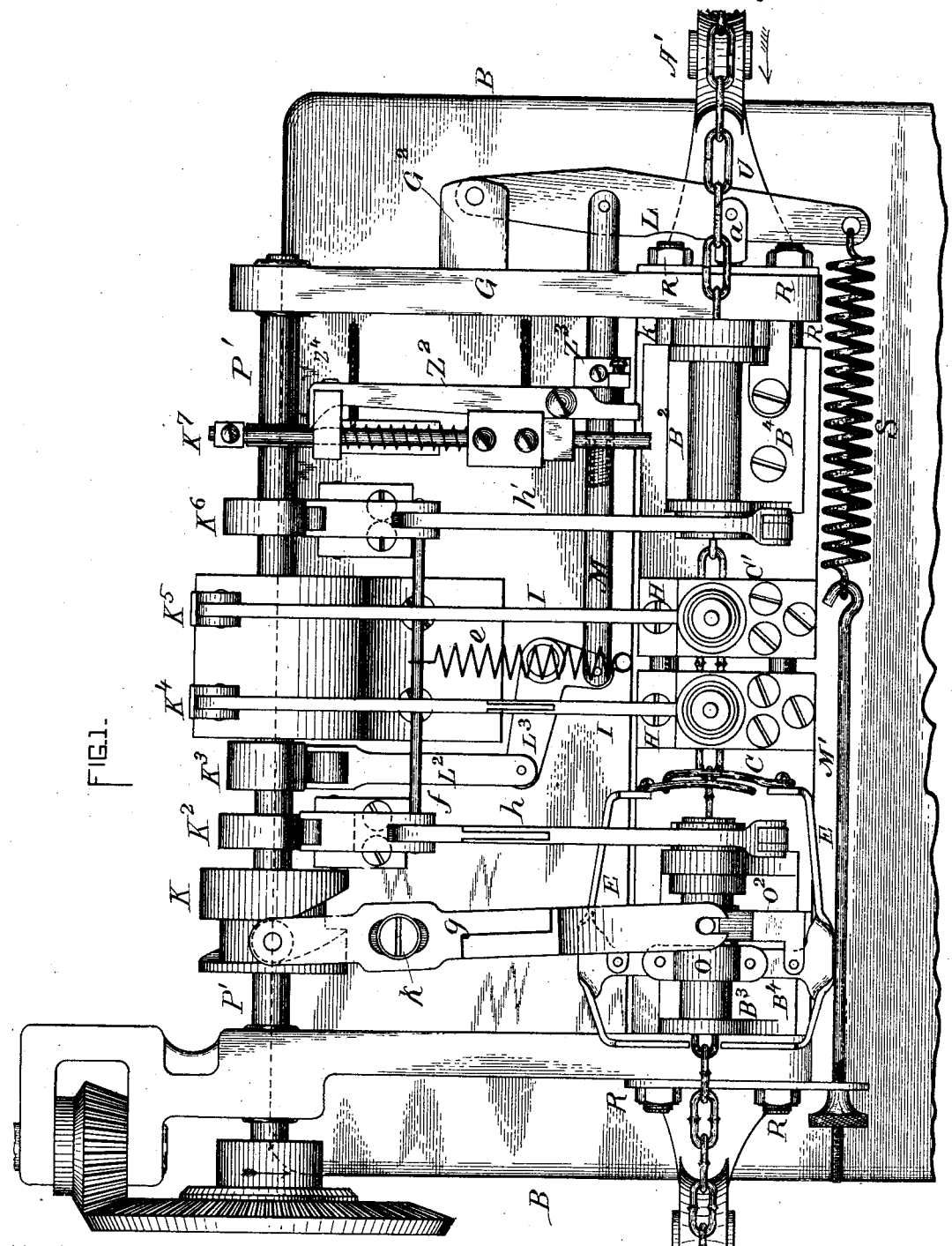

(No Model.) 4 Sheets—Sheet 3.

E. THOMSON & C. E. HARTHAN.
AUTOMATIC CHAIN WELDING MACHINE.

No. 501,546. Patented July 18, 1893.

WITNESSES.
O. F. Macdonald
J. A. Hurdly

INVENTORS.
Elihu Thomson
Chas. E. Harthan
By H. L. Townsend
Attorney (No Model.) 4 Sheets—Sheet 4.
E. THOMSON & C. E. HARTHAN.
AUTOMATIC CHAIN WELDING MACHINE.
No. 501,546. Patented July 18, 1893.
Fig. 6.
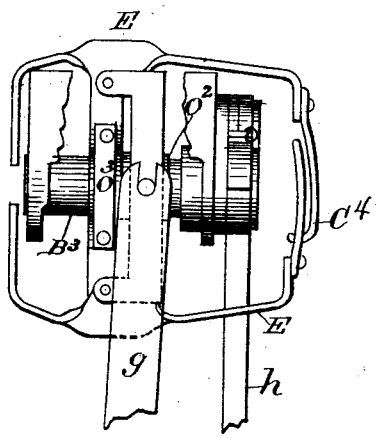
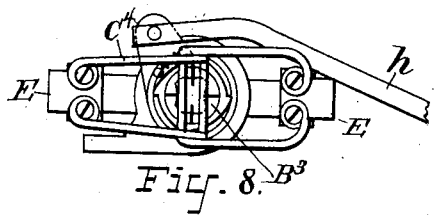
Fig. 8.
Fig. 9.
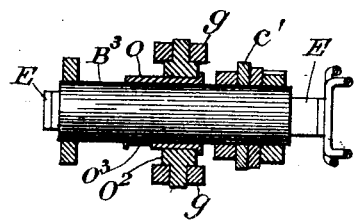
Fig. 7.
ATTEST:
J. H. Hurdle
J. F. Courey
INVENTORS:
Elihu Thomson
Chas. E. Harthan
By H. L. Townsend
Attorney

United States Patent Office.

ELIHU THOMSON, OF SWAMPSCOTT, AND CHARLES E. HARTHAN, OF LYNN, MASSACHUSETTS, ASSIGNORS TO THE THOMSON ELECTRIC WELDING COMPANY, OF MAINE.

AUTOMATIC CHAIN-WELDING MACHINE.

SPECIFICATION forming part of Letters Patent No. 501,546, dated July 18, 1893.

Application filed January 8, 1891. Serial No. 377,154. (No model.)

*To all whom it may concern:*

Be it known that we, ELIHU THOMSON, residing at Swampscott, and CHARLES E. HARTHAN, residing at Lynn, in the county of Essex, State of Massachusetts, citizens of the United States, have invented certain new and useful Automatic Chain-Welding Machines, of which the following is a specification.

Our invention relates to an apparatus in which the heating power of an electric current is employed for bringing the material to the desired condition of plasticity, which is then subjected to the desired metal working operation.

The object of our invention is to so construct the apparatus that the operations of feeding the material, heating it and subjecting it to the desired action shall be automatic in their character in whole or in part as hereinafter described, and as an illustration of an apparatus embodying our invention we have shown a machine in which the metal working operation is an upsetting and welding one, though we do not by any means limit ourselves to a machine in which the metal working devices themselves are of any particular character, since this part of the device may be modified in shape or character according to the work to be done, and as now well understood in the electric metal working art. To exemplify our invention, however, we have shown the manner of combining the various device in a machine adapted for electric welding or electric upsetting performed upon different parts or portions of the work in succession as they are fed into position for heating and working.

We have also shown the machine as provided with means especially adapting it for welding in succession links of a chain, the individual links of which have been previously bent into shape by hand or in another machine ready for the welding of a joint in the side of each link. In a machine organized for this special purpose it is desirable to employ means for guiding the chain and also means for shifting the position of the chain with relation to the work holder, but these latter devices, as will be well understood, may be omitted with other kinds of work.

In the preferred form of our invention we organize the machine so that in addition to an automatic feed and an automatic control of the current, there shall be means for automatically clamping or fixing the work in position. The latter devices it is desirable to employ in most kinds of welding machines though there are forms of metal working machines in which a movement similar to that of electric welding or, in other words, an end movement or pressure upon the work, is produced without the necessity for special clamping of the material. We do not, therefore, wish to be understood as limiting ourselves to a mechanism in which a clamping device is employed or in which the clamping is produced automatically at the proper time as hereinafter described with relation to the feeding of the work and putting on of the current.

Our invention consists in the novel combinations of devices and the special details of construction hereinafter described and more particularly specified in the claims.

Figure 2:
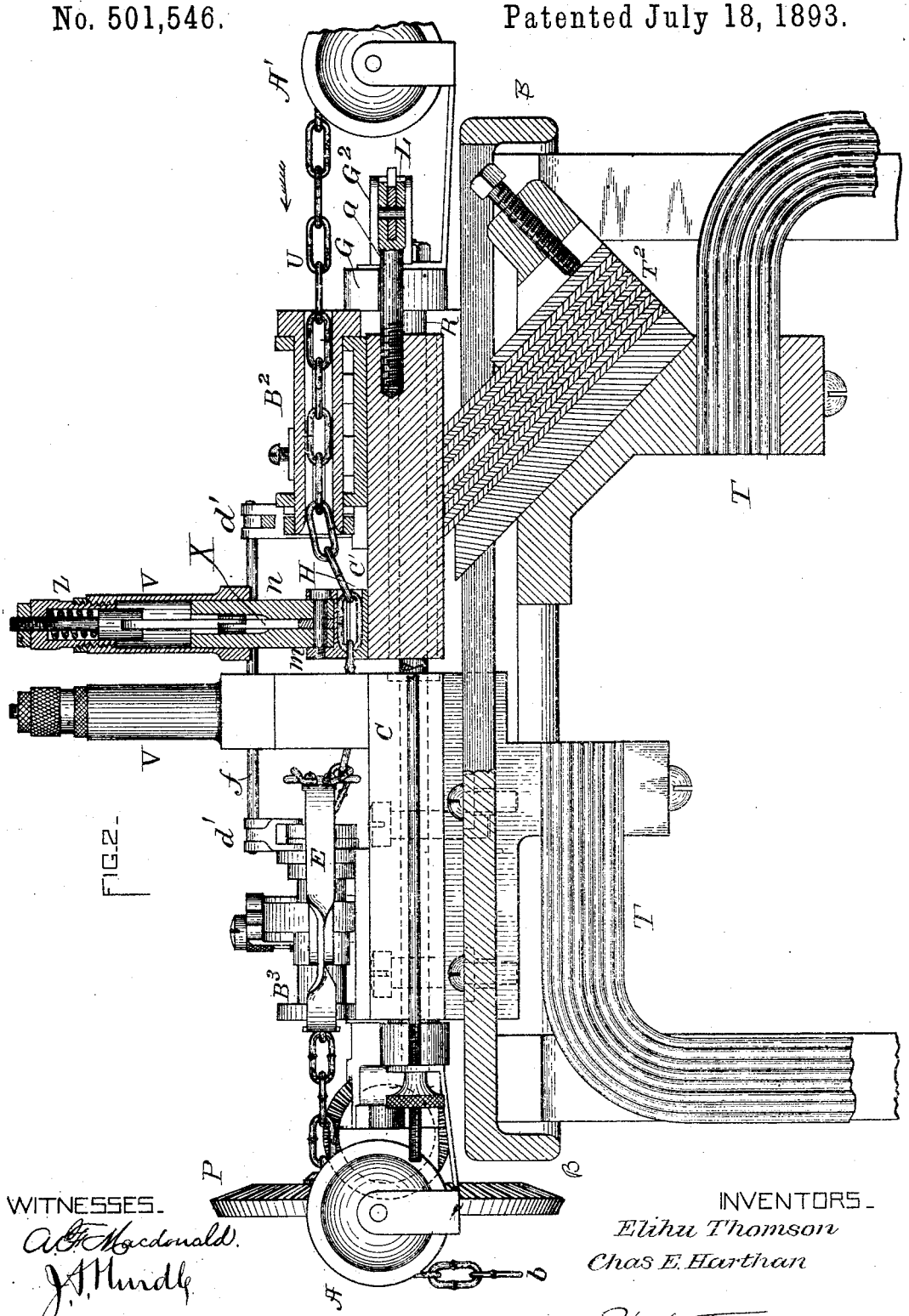
Figure 3:
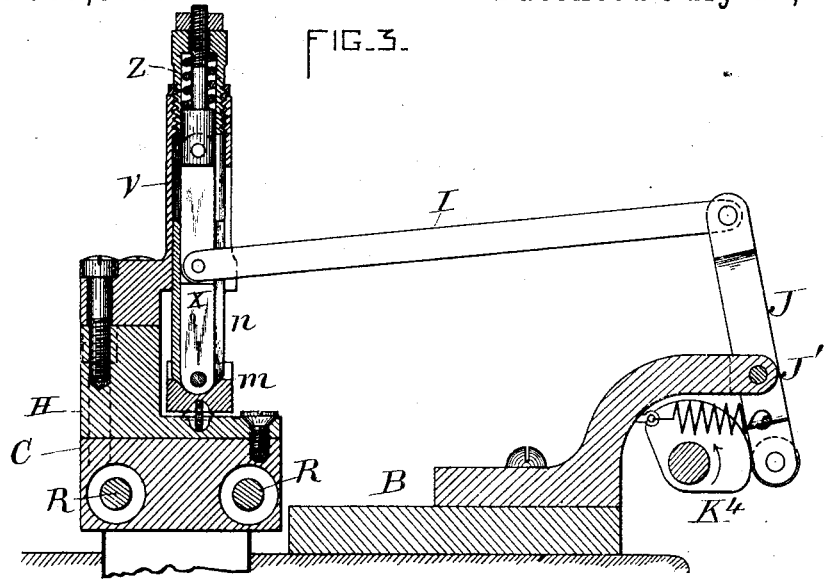
Figure 4:
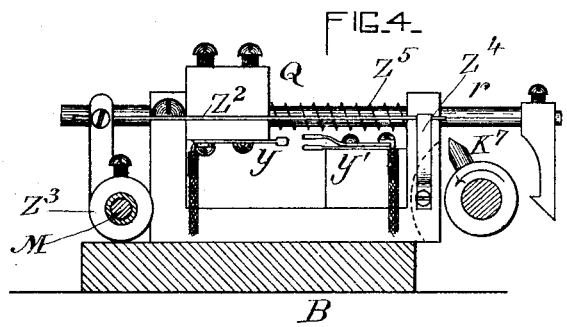
Figure 5:
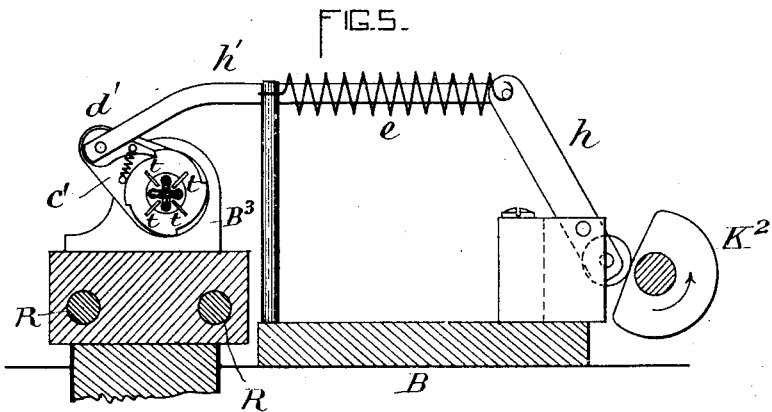

In the accompanying drawings:—Figure 1, is a plan of a form of apparatus embodying our invention. Fig. 2, is a partial side elevation and vertical longitudinal section through the same. Fig. 3, shows a part of the mechanism which may be used for clamping the work when the work holders are provided with a special setting and releasing clamp and are organized for the welding of chain. Fig. 4, illustrates a part of the current controlling devices. Fig. 5, illustrates a mechanism which may be used for shifting the position of the work with relation to the parts which operate upon it and which is especially adapted for use on a chain welding machine. Fig. 6, is an inverted plan view of a mechanism specially adapted for feeding and turning the chain. Fig. 7, is a partial longitudinal section through said device. Fig. 8, is an end view of the feeding jaws. Fig. 9, is a cross section through one of the chain guides.

C, C', are heating electrodes to which electric current is supplied for the purpose of heating the work which by means of a step by step or intermittently operating feed mechanism of proper construction is fed, one piece or portion at a time, into position for heating, is then allowed to remain in position for heating while the current passes from C to C', a proper length of time, depending upon the material and its size, and is then subjected to the proper mechanical force or operation for the welding, upsetting, forging or other operation upon plastic or heated metal. It is preferable to effect the heating of the work by allowing the work itself to form part of the electric circuit from C to C', by resting in contact with the same to bridge the gap between them, and, by forming itself a part of the circuit of some considerable resistance, to be heated by such current.

In combination with the electrodes we prefer to employ clamp jaws or blocks for holding the work down upon the electrodes or holder C, C', especially when the parts of the machine are organized for electric welding and the welding is done while the work lies upon the said electrodes, although in some operations it would not be necessary to use such clamp jaws or blocks when the electrodes are properly modified in shape or proper provision is made to receive the work between them in a different way. The primary object of these electrodes is to furnish current to heat the work, but they also preferably serve as the work holders for grasping or holding the same during the mechanical operation following or accompanying the heating, and we have herein, therefore, shown and described them as organized and constructed with special reference to a particular metal working operation, to wit: electric welding and upsetting, in which case they would correspond to the ordinary clamps of an electric welder. They are also shown as constructed with special reference to welding the links of a chain.

B, is the table upon which the various parts of the apparatus are mounted and P', is the driving shaft mounted upon the side of said table and operated from suitable gear for the purpose of operating or controlling the operation of the various mechanisms as hereinafter described, and preferably by means of the several cams K, $K^2$, $K^3$, $K^4$, $K^5$, $K^6$, $K^7$, as hereinafter more particularly set forth.

The electrodes C, C', consist of two heavy blocks of metal of sufficient size not to be much heated by the current employed in heating the work. They are mounted in any suitable manner as for instance on two rods R, R, of steel or other suitable material which are supported over the table and serve as guides independent of the frame of the machine for one or both of the blocks C, C', when they are used as the holders for the work.

The upper part of each block or electrode C, C', consists preferably of a steel plate H, Figs. 1, 2, and 3, which is fastened down upon the copper block C, C', and is cut away at its top to form a seat for the material operated upon. When used for welding links of a chain of the form herein shown, the plate is preferably cut away to receive each link to be welded the opening being of proper size and shape to give clearance back of the point of clamping of the link for the link joined to it.

m, m, are movable clamp jaws or blocks swinging on the ends of slides or plungers n, which move up and down in a guide V. These clamp jaws or blocks m, are brought down and clamped upon the work and are raised from the same to free it intermittently through the operation of a suitable automatic actuating mechanism which is constructed or adjusted to clamp and release the work between the successive feeding operations of the mechanism to be presently described which moves the work into position between the electrodes C, C'.

The plunger and block are operated preferably by means of a toggle joint the lower member of which is pivoted to the slide or block while its upper member is pivoted on a head or block W, which is fitted to move at the top of the guide or standard V, and is provided with a stiff downward pressure spring Z, the tension of which may be adjusted by means of an adjustable nut as shown in Fig. 3. The center of the toggle is connected by a rod I, with the lever J, pivoted at J', on a standard supported on the table B, and operated upon by a cam $K^1$, on the shaft P', and a suitable spring as indicated. The cam is shaped as shown so as to move the clamping devices in a direction to hold the work in place. By means of the spring Z, a uniform pressure may be produced in every case sufficient, however, to secure the clamp to the work. The pressure can be varied by means of the adjustment provided. The advantage of the construction shown is that all extra friction is removed from the sliding block carrying such clamp when the clamp jaw is fastened down upon the work. The three joints of the toggle and all strains are in a direct line and no pressure from outside is required to hold the clamp blocks down in position. Thus the sliding block may move as freely when the link is clamped as when no pressure is upon the clamping block.

In the present instance we have shown the electrode or holder C', as alone movable for the purpose of operating upon the heated work in the welding and upsetting operations to which we have shown the parts of the apparatus adapted.

The block, holder, or electrode C', is made to operate on the heated work at the proper times by means of intermittently operating actuating devices which may be constructed as follows:—L, is the horizontal moving lever pivoted on a bracket $G^2$, and connected by means of a link a, with the rear end of the sliding block C'. The movements of this lever are produced or controlled from a cam $K^3$, on the shaft P', which operates on a bar $L^2$, carrying a roller which bears against the cam surface from which bar movement is communicated to the lever through a crank lever $L^3$, and a rod M. S, is a spring connected to the lever L, and tending to move the slide C', which engages with the work, in a direction to produce the desired action upon the heated metal as for instance the welding or upsetting operation. The slide C', is hence moved in one direction by the cam acting positively on it and in the other direction by the spring as the cam moves around to its other position. If desired a slip joint may be placed in the connection M, to allow a movement of the slide C', at the time the metal is operated upon though with a cam of the form described such slip joint is unnecessary. The times when the slide C', is moved in one direction to operate upon the work and is then retracted preparatory to a new operation, would obviously depend upon the shape of the cam $K^3$. Such cam is properly shaped and adjusted upon the actuating shaft P', that it will allow the spring S, to apply pressure to the slide C', after the work has been received in position thereon and has been properly clamped or not as desired. The pressure may be applied either before or after the work has been heated. In electric welding machinery it is customary to apply the pressure before the work has been heated by the current and in some cases even before the current is turned on, and allow the movement under the pressure applied to take place only after the metal has been properly softened. The proper movements of the device, as slide C', which operates upon the heated work are made, by the cam $K^3$, and intermediate actuating mechanism, to take place at proper times with relation to the clamping of the work and the feeding of the work, and the furnishing of a heating electric current to the electrodes C, C'. Between the successive movements of the holder C', or other device which subjects the heated work to the desired mechanical operation, the flow of the heating current is stopped by the action of a current controller actuated or controlled from the shaft P', or other source of power and operating intermittently to first cause heating current to flow for a determinate period and then to stop the flow of current.

By the term current controller we mean any device which will serve to start up a flow of current to the electrodes C, C', or to cause the flow to stop. As a simple device for the purpose we use a circuit closer and breaker in the primary circuit of an induction coil or transformer the secondary of which is of low resistance, as is usual in welding or metal working apparatus, and is connected to the electrodes C, C', in any proper manner, as will be presently described. This circuit controller is actuated or controlled by a cam $K^7$, on the main shaft and is constructed and made to close and open the circuit in the following manner. r, is a reciprocating rod or bar which works in suitable guides in the base B, and carries a block of insulating material Q, which supports a circuit closing spring $y$, connected with the primary circuit. The contact spring $y$, is adapted to close and break circuit between two similar springs $y'$, mounted on a fixed block of insulating material and connected by a wire or cable with the other pole of the primary circuit. The longitudinal movement is given to the bar $r$, for the purpose of closing the primary circuit and thereby causing current to flow through the electrodes C, C', by means of the cam $K^7$, and a catch consisting of a pivoted lever $Z^2$, which engages with a notch in the side of the bar $r$, as shown in Fig. 1, serves to hold the circuit closing springs in contact until the catch lever releases the bar. A spring $Z^4$, presses the catch lever in position to engage with the rod $r$, while the spring $Z^5$, surrounding the rod and held between one of the guide standards and the block Q, serves to retract the rod when released. The cam $K^7$, is so adjusted upon the driving shaft with relation to the other operating mechanism that it shall cause the circuit to be closed when a section of work has been brought into place for heating. Preferably, the circuit is not closed until the cams which operate upon the movable clamp jaws have brought such clamp jaws or blocks down against the work. After the heating has progressed to the desired extent the bar $r$, is released for the purpose of opening the contacts $y, y'$, and thereby cutting off the flow of current through such electrodes. Such release of the current controller may be effected by any part of the moving mechanism, but in the welding, forging or riveting apparatus, it is preferred to secure the reverse movement of the current controller through the action of some part moving with the welding clamps, or other device moving with the work. Thus, we have shown for the purpose a collar $Z^3$, mounted on the rod M, and having a vertical arm which carries a projection adapted to engage with the lever $Z^2$, for the purpose of unlatching it. The collar $Z^3$, is preferably adjustable to determine the time at which, in the movement of the work holder C', the current shall be cut off therefrom. During the reverse movement of the work holders C', under the influence of the cam $K^3$, the current will remain cut off until the cam $K^7$, shall have moved around to position to reverse the movement of the rod $r$, after which and the heating of the work to the desired extent, the holder C', moves in a forward direction to upset or weld the metal.

We do not limit ourselves to any particular adjustment of the current controller devices with relation to the actuating cam $K^3$, since, as will be obvious, the current may be thrown on at any time after the work has been brought to position between the heating electrodes C, C', and may be thrown off when the heating has progressed to the desired extent and either before, during or after the movement of the clamp or work holder C'. We prefer to adjust it, however, so that it shall remain thrown off during the whole of the time between the completion of the movement of the holder C', in acting on the heated work and the time when it shall be necessary to throw on the current in order that the work may become sufficiently heated for the repetition of the metal working operation.

The means for feeding the work or successive portions thereof into position for heating by the electric current and for operation by the metal working devices in the manner before explained so that successive portions or parts of the work shall rest for determinate periods in position and shall then be removed, we have herein shown as consisting of a step by step feeder especially adapted for feeding or drawing a chain through the machine the links of which chain have previously been formed by bending into an oval shape as indicated from blanks or pieces of wire, the bent ends abutting at one side of the link. The links so formed are welded by the apparatus shown through the heating of the middle portion of the link and the application of pressure when the link has been heated which welds the link at one side and simultaneously upsets the other side as shown in the links which have passed through the machine.

The feeder has its jaws so constructed that it may grip the chain and feed it along for the distance of one link so that a new link may be placed directly over the contact pieces in the position indicated in Fig. 1, at each forward movement of the feed mechanism.

E, E, are two pivoted gripping levers provided for the purpose of taking hold of the chain, and they are preferably provided with jaws which shall take hold of the link at two points. Those which are nearest the welding and heating electrodes are shown more clearly in end view in Fig. 8, and consist of two looped pieces of wire the ends of the loops overlapping upon one another and embracing the chain between them. The jaws at the other end of the gripping levers may be plain as indicated.

The gripping levers E, are pivoted upon a sleeve or guide O, which is capable of longitudinal movement on a cylinder $B^3$, which serves as a guide and shifting device for the chain and is given a rotation in a plane transverse to the movement of the chain for the purpose of shifting the relative position of the work to the devices acting on it.

$O^2$, is a yoke which is capable of sliding on the sleeve O, and has arms which are connected to the gripping levers E, as indicated more clearly in the plan view. The yoke $O^2$, is reciprocated with the sleeve and gripping levers by means of a lever $g$, which has a forked end engaging with pins on the yoke $O^2$.

Movement is given to the lever $g$, by means of a cam K having a groove in which travels a roller carried by the end of the lever $g$.

The center or pivot $k$, around which the lever $g$, rotates is made adjustable preferably to and from the cam to vary the throw of the feeding mechanism. The lever $g$, is also preferably provided with an insulating joint or break to interrupt the electrical connection between the welding clamps and the frame of the machine.

The sleeve O, is preferably provided with a friction spring $O^3$, which bears against the cylinder $B^3$, and serves to prevent the sleeve from moving freely when the lever $g$, moves for the purpose of moving the grip levers to cause their jaws to engage with the chain or other material. By this means the gripping action is made more positive. When, however, the jaws are gripped upon the chain and further movement of the yoke $O^2$, upon the sleeve O, is thus prevented, the sleeve O, with the gripping levers will be moved forcibly despite the friction of the spring $O^3$, and the material will be fed the necessary distance. On the reverse movement the friction spring holds the sleeve O, so that the gripping levers E, may be moved to bring the grip jaws away from the chain or other material after which and the engagement of the yoke $O^2$, with a shoulder on the end of a sleeve forming a suitable stop limiting their swinging movement, the further movement of the lever $g$, will result in carrying the devices with the sleeve O, back bodily so that on the next forward movement the jaws may grip links in the chain back of those previously engaged. The engagement of the overlapping portions of the jaws $C^4$ may serve the same purpose as the shoulder.

In the drawings the devices are shown as nearly retracted and the first movement of the lever $g$, results in swinging the grip levers E, so as to cause the grip jaws to take hold of the chain after which the parts are moved bodily to feed the chain or other material. The cam K, is so constructed that the time between the successive feed movements shall be sufficient for the heating of the material and the operation of the metal working devices upon the heated substance after which a new piece of material is fed into the circuit and the operation repeated. With other work the shape of the clamping jaws which feed the material and the construction of the feeding mechanism itself would be properly varied as will be well understood by mechanics.

While we have shown the feed mechanism as a reciprocating mechanism, it will be obvious that it might operate in other ways to feed a new piece or portion of the work into the position to be heated and to there leave it for a sufficient time to permit it to be heated to plasticity and to permit further the desired mechanical operations to be performed upon the heated metal.

The operation of the feeding mechanism is by a suitable adjustment of the actuating cams K, $K^7$, with relation to one another when actuated by shaft P', such that during each feed movement the current shall be cut off from the electrodes C, C', but that on the completion of the feed movement and after a greater or less interval, as desired, the current shall be thrown on and shall remain on for a greater or less length of time as desired but be again cut off previously to the action of the feed mechanism in a direction to feed the material.

Other devices which are preferably employed when the machine is used for chain welding are as follows: A, A', are two deeply grooved guide pulleys which guide the chain in its movements. The surface of the grooves in the pulleys is smooth so as to allow the chain to twist freely in its passage through them. In its passage from one pulley to the other the chain passes through two rotary guides and work shifters $B^2$, $B^3$, properly constructed to guide the chain in proper position. These guides also serve to turn the chain for a purpose to be presently mentioned and for such purpose are made capable of rotation in a plane transverse to the line of feed of the chain. These guide cylinders are mounted on brackets or plates $B^4$, as indicated. The guide $B^2$, through which the unwelded chain U passes on its way to the welding clamps has a cruciform interior to guide the chain, as indicated in Fig. 9, while the guide cylinder $B^3$, through which the welded chain passes out of the machine is provided at its interior with four radial perforations or projections $t$, seen in Fig. 5, which are equal distances apart but do not meet at the center, and extend the entire length of the cylinder. The spaces between these projections are for the free passage of the burr raised on either side of the link in the welding operation. With each forward movement of the chain to bring a new link into position for welding the two cylinders $B^2$, $B^3$, are given a quarter turn or revolution through suitable mechanical connections with the main shaft P'. This rotation is rendered necessary by reason of the fact that each succeeding chain link has to be placed at right angles to the previous one in order that each may lie in turn in a horizontal position in the welding clamps. The rotary motion may be continuous in the same direction or might be simply a reciprocating motion which would turn the chain first in one direction and then in the other through an angle of ninety degrees, but in our present construction we have shown means for producing a continuous rotation of ninety degrees at each forward feed movement.

A continuous rotation of the guides is necessary where the machine is run in connection with a chain making machine in which the chain is twisted as it leaves such machine. By giving a corresponding twist continuously in the same direction in the welding machine the kinking between the two machines will be prevented.

The cylinders or guides may be rotated by a pawl and ratchet device as shown more clearly in Fig. 5, the ratchet teeth being four in number upon the end of the guide cylinder and being engaged by a pawl $d'$, carried upon a swinging arm $c'$, connected through a link $h'$, with the lever $h$ which is subjected to the action of a cam $K^2$, on the shaft P', and a spring $e$. By these devices the actuating pawl is moved backward and forward and caused to turn the cylinder or guide a quarter revolution for each whole revolution of the cam shaft carrying the cam $K^2$.

The guide cylinder $B^2$, is operated by means of a cylinder or cam $K^6$. The two levers operated by said cams are connected by a cross rod $f$, to which the spring $e$, is attached.

To insulate the electrodes C, C', from one another an insulated joint may be interposed in the connections from one actuating device to the other as for instance in the rod $h$, as indicated.

It will be observed that the center line of the chain through the revolving guides or cylinders is some distance above the surface of the welding clamp. The reason for this is that the chain may thereby more readily find the exact position in the welding clamp as it is pressed down by the clamp jaws or blocks.

A further object is that the chain may be free to turn when the cylinders are rotated, the chain being at such time lifted away from the blocks by the action of the feeding device which tends to straighten the chain. Besides the chain may have a more free movement when it is fed longitudinally, being at such times lifted away from the blocks C, C'.

The current is furnished to the blocks C, C', from any source, but preferably by the secondary of a transformer, the terminals of which are indicated at T, T. The block C, being stationary, the terminal of the secondary may be fixed to a projection from said block C. For the movable electrode C', we provide a wire or laminated brush or brushes $T^2$, clamped in a suitable holder to which the opposite terminal of the secondary is connected and bearing upon the under side the sliding clamp or electrode C'. The brushes are placed at an angle of forty five degrees more or less to the surface with which they engage. Hence the clamp may move forward freely as less friction is produced in this movement, but on backward movement of the clamp a scraping effect is produced by the inclined ends of the brushes thus keeping the contact surface bright and clean. A slight spring may be given to the brush sufficient to always insure proper contact.

The general operation of the apparatus having its details constructed as described for special use in the electric welding of the chain is as follows;—the parts being in the position which they would occupy at the completion of the welding and upsetting operation. On the continuation of the movement of the shaft P', the cam $K^4$, frees lever J, and the spring attached thereto begins to release the clamp block or jaw $m$, by moving the toggle joint outward. The cam K, which also moves at the same time will begin to move the lever $g$, but the gripping levers E, will not engage by their jaws with the chain until the clamp jaw $m$, has been sufficiently relieved to permit the chain to move without interference. As the chain is fed forward a turning movement is imparted to it by means of the cam $K^2$, in obvious manner. The cam $K^3$, also acts during this operation so as to move the actuating lever L, back with the slide or electrode C', so that the latter may be in position to receive the next link of the chain preparatory to the welding operation. It is not necessary that this backward movement of the actuating device L, under the influence of the cam $K^3$, should take place simultaneously with the forward feeding and turning of the link but it might follow such feeding movement at a time depending upon the adjustment of the cam $K^3$. By the time, however, that the chain has been fed forward and turned and the electrode C', has been moved back to position preparatory for another heating and welding operation, the cam $K^4$, will begin to rotate upon the lever J, so as to move the toggle joint inward and finally clamp the chain firmly by the clamp jaw or shoe $m$. At or about the time of clamping or previously or subsequently thereto as desired, the cam $K^7$, will have moved around and set the current controller so as to throw the heating current through the work and when the same has become sufficiently heated and softened the actuator L, which through the continued movement of the cam $K^3$, will have been left free to the action of the spring S, will move the electrode C', carrying the work, and effect the welding operation. In this movement the current will be cut off through the reversal of movement of the current controller brought about by the tripping of the lever $Z^2$, in the manner before explained. The interval which shall elapse between the throwing on and the throwing off of the current may obviously depend upon the particular kind of work to be done, but in the particular construction of apparatus shown no special adjustment of the devices need be made with reference to this action since after the work has been fixed in the clamps and the current turned on, the turning off will follow only as a result of the heating of the same to such an extent that the lever L, or actuator may move under the action of the spring S. We do not claim, however, in this application the use of the spring and the automatic trip for throwing off the current in the manner described that being already the subject of a patent to E. Thomson, No. 385,022, dated June 26, 1888. The combination, however, of such devices with the automatic current controller which is automatically set to put on the current forms a part of the present invention.

In the foregoing description we have described each part of the mechanism as acting in a cycle of operations which may be briefly set forth as follows:—The clamp jaws or blocks rise, the chain feeding and turning mechanism, or other devices for bringing the work into proper position in the machine, act; the work holder or block C', is reversed; the clamping jaws clamp the work; the current is turned on and the work holder left to the action of spring S, thus applying pressure and welding and upsetting the link; the current is turned off and the work feeding and turning mechanism resumes the position shown ready for a repetition of the operations. It will be readily understood, however, that the beginning of the action of each device in this cycle of operations does not necessarily await the cessation of action of a device which produces the next previous step of the operation and in fact the movements of some of the devices may overlap in time upon the movements of other devices as has in part before been mentioned. Thus for instance the feeding and turning mechanism may begin to move before the clamp jaws or blocks of the work holder are fully raised by the cam and toggle. The cam $K^3$, or other device used for the purpose may begin to reverse the work holder, electrode or abutment C', during such turning and feeding movement, or when the cams K, $K^2$ and $K^6$, are shaped as shown so as to hold the feeding and turning devices in forward position for some time, the reversing mechanism would not require to act until after the completion of the feeding and turning movement though before the clamp jaws or blocks descend in case such movable jaws or blocks are used. The clamp jaws may begin to descend under the operation of the cam and toggle before the block C', is fully retracted. The current may be turned on at the instant the clamping is effected or just before the clamp jaws are down or may follow at an interval after the clamping. The cam which permits the reverse movement of the part C', in the direction to act on the work may pass into position to free the said part either before or after the current is applied, and the current may be turned off at any time before the work is moved from position or might even be continued into the time when the clamps begin to rise or the feed mechanism begins to operate again. The reversal of movement of the feeding and turning mechanism to position to feed might obviously begin immediately after the feed, but in a machine where the work is of the form described and clamping jaws are employed, should preferably not begin until the jaws are down since in dragging on reverse movement the feed jaws might derange the position of the work in the work holders. Such reverse movement may, however, begin as soon as the work has passed to position or is held so that it cannot be deranged or displaced and could therefore take place during the heating of the work and be completed before the heating operation ceases or at any other time which will bring it into position ready for a feed on the completion of the cycle.

It should also be understood that the action of the feeder and the work shifting appliance need not be simultaneous, but that one may follow or lap upon the operation of the other. These various modifications would be produced by simple modifications in the shape or adjustment of the operating cams.

While we have described a spring as the means for moving the electrode or work holder in a direction reverse to that in which it is periodically moved by the cam or continuously operated device, we do not limit ourselves to a spring but may use any other source of power connected to the electrode and intermittently relieved so that it may move the same.

While we have described the electrode or work holder C′, as one by which the work is grasped or held it is obvious that, as well understood in the art of electric metal working, it might engage or abut against the work end or, as in some upsetting or heading operations, as for instance in riveting, without changing its essential manner of operation in combination with the other mechanism.

In the operation of upsetting a plain rod, bar or wire, at intervals, it is apparent that the turning guides or cylinders for shifting the position of the work with relation to the holders would be unnecessary.

We mean to include by the term "work holder" as used in the claims, a block C′, which acts on the work in any way when heated and whether provided with the clamping jaws or blocks or not.

It should also be understood that we do not limit ourselves to supplying heating current to the work through the work holder as the work held or subjected to action by the metal working device as C′, may be supplied with heating current through other devices.

We do not limit ourselves to performing all of the operations hereinbefore described automatically in the manner and order set forth since it would be within our invention to omit some of the devices as hereinbefore intimated and in fact we perform some of the operations by hand. The devices to be omitted would of course depend upon the character of the work to be done and the parts of the operation which might be left to the hand of an attendant would be a matter largely of choice.

What we claim as our invention is—

1. In an electric metal working apparatus, the combination of electrodes for passing a heating electric current through or into the work, and a step by step feeder for feeding the work intermittently or step by step to cause portions or pieces thereof to rest successively in position in the electric circuit between said electrodes.

2. The combination in an electric metal working apparatus, of a pair of heating electrodes, and an oscillating or reciprocating feed jaw or jaws in line with the same for feeding the work longitudinally step by step across the space between said electrodes.

3. In an electric metal working apparatus, the combination with heating electrodes, of an oscillating feed jaw for feeding the work intermittently into and out of position in the electric circuit between said electrodes.

4. In an electric metal working apparatus, the combination with heating electrodes, of a step by step feeder in line with said electrodes for feeding the work into and out of position in the electric circuit between said electrodes.

5. The combination in an electric metal working apparatus, of work holders, means for supplying a heating electric current to the work while held in position between them, and an intermittent or step by step feeder in line with said work holders.

6. In an electric metal working apparatus, the combination, substantially as described, of a step by step feeder acting intermittently to feed the work into and out of position in a heating electric circuit, and an intermittently acting current controller for causing heating current to flow between the successive feeding operations.

7. In an electric metal working apparatus, the combination substantially as described, of heating electrodes adapted to receive the work between them, an oscillating feed jaw or jaws for feeding the work intermittently into position between said electrodes, and an intermittently acting current controller for causing the heating current to flow between the feeding operations.

8. In an electric metal working apparatus, the combination substantially as described, of heating electrodes, a step by step feeder for feeding the work intermittently into position in circuit between said electrodes, clamping jaws or blocks for holding the work in contact with said electrodes, and an intermittently operating actuating mechanism for said jaws or blocks for fixing and releasing the same between the successive feeding operations.

9. The combination, substantially as described, in an electric metal working apparatus, of heating electrodes adapted to receive the work between them, a step by step feeder for feeding the work into position between said electrodes, clamping jaws or blocks, a current controller, and intermittently operating actuating devices for said jaw and current controller, for clamping the working and turning on the heating current between successive operations of the feeder.

10. In an electric metal working apparatus, the combination of heating electrodes adapted to receive the work between them, clamp jaws or blocks for holding the work, a current controller for turning on the heating current, and a connected actuating mechanism for said jaws and current controller whereby the work may be fastened and the current then turned on as a connected or substantially single operation.

11. In an electric metal working apparatus, the combination of clamp jaws or blocks for holding the work in circuit, mechanism for reciprocating said jaws or blocks, and an automatic current controller for setting up a flow of current after the clamp jaws or blocks are set and cutting off the flow of current before or about the time that they release the work.

12. In an electric metal working apparatus, the combination substantially as described, with the clamp jaws or blocks for holding the work in position to be heated by the electric current, of a current controller, actuating mechanism for said controller and clamp jaws adapted to set the controller after the closure of the clamp jaws, and a releasing dog or detent adjusted to release the current controller, as and for the purpose described.

13. In an electric metal working apparatus, the combination with an intermittently acting mechanism for operating upon the heated work, of an intermittently acting step by step feeder for feeding the work to position in the heating electric circuit, and an intermittently operating current controller for removing the heating current previous to each feeding operation of the feeder.

14. In an electric metal working apparatus, the combination with an intermittently operating actuator for the mechanism which operates on the heated work, and an oscillating or intermittently operating current controller for automatically cutting off the current between the movements of said mechanism.

15. The combination in an electric metal working apparatus, of a movable work holding clamp or clamps, a reciprocating or intermittently operating actuator therefor, an oscillating or reciprocating feeder for feeding the work into position in said clamps or holders, and a current controller for intermittently causing the heating electric current to flow between the successive feed movements of the feed mechanism.

16. In an electric metal working apparatus, the combination with work holding devices and means for passing a heating electric current through the material while held by such devices, of a reciprocating actuating mechanism for moving a holder in a line parallel to the line joining said holders, and a step by step feeder for moving the work into position between the holders, between the successive operations of said actuator.

17. The combination in an electric metal working apparatus, of an intermittently operating feeder for feeding the work into position in an electric circuit between two electrodes, means for giving an end movement to the work while softened for upsetting, welding or other operation, and an automatic current controller for causing the current to flow through the work between the successive feeding operations.

18. In an electric metal working apparatus, the combination of two holders, one or both of which are movable in the line of the feed, a reciprocating automatic feeder for feeding the work longitudinally into position between said holders, and a reciprocating actuator for intermittently operating the movable holder or holders between the successive feeding operations.

19. In an electric metal working apparatus, the combination of a suitable clamp or holder movable in the direction of the feed, a reciprocating automatic feeder for feeding the work longitudinally and step by step into position in said clamp or holder, and an automatic actuating mechanism for the latter, timed to move the holder between the successive feed operations.

20. In an electric metal working apparatus, the combination with a clamp or holder and mechanism for reciprocating the same so as to subject the electrically heated work to a squeezing or upsetting force, of a step by step feeder for moving the work into position in said holder, said feeder being connected with actuating devices timed to produce a feed movement in the interval between the movements of the holder which operates on the work.

21. The combination in an electric metal working apparatus, of a work holder or abutment for operating on the heated work, a spring for acting on the same to upset, weld or otherwise act upon the work, and a cam or equivalent device actuated from a power driven shaft for periodically reversing the movement of the holder and then leaving it to the action of the spring.

22. In an electric metal working apparatus, the combination with a sliding electrode or work holder, of means for supplying electric current thereto, a continuously revolving cam or other device for moving the same in one direction, and a spring for moving it in the other direction.

23. In an electric metal working apparatus, the combination substantially as described, of a work holder, a driving shaft P', mechanism for reciprocating said work holder from said power shaft, a current controller, and an actuating cam therefor or similar device, also operated by said shaft.

24. In an electric metal working apparatus, the combination of a reciprocatory work holder, means for supplying current thereto, a power shaft, a cam or equivalent device acting on the work holder through suitable devices, a current controller, an actuating device moving said controller periodically into position to cause current to flow to the work holder, and an automatic trip for releasing the current controller when the work holder moves in a direction to act on the heated work.

25. In an electric metal working apparatus, the combination with a reciprocating electrode connected with a source of heating electric current, of a spring tending to move the same in one direction, mechanism for periodically moving the same in the opposite direction, a current controller, actuating mechanism for periodically setting the same, a dog or catch, and a trip connected with the electrode for releasing said current controller when the electrode moves under the action of the spring.

26. The combination substantially as described, in an electric metal working apparatus, of a reciprocatory work holding electrode C', connected with a source of electric energy, a current controller, a catch for holding the same set, a trip moving with the electrode for releasing the same on forward movement of the electrode, a continuously operating driving shaft and connecting devices between the same and the electrode and current controller, whereby the electrode may be moved rearwardly and the current controller may be set to cause current to flow, as and for the purpose described.

27. In an electric metal working apparatus, the combination of a reciprocatory work holder connected to a source of electric energy, a current controller, a revolving shaft, two cams thereon, and mechanisms actuated by said cams and connected respectively with the work holder and current controller.

28. The combination in an electric metal working apparatus, of a reciprocatory electrode, a transformer whose secondary connects with the same, a current controller for periodically closing the circuit of the primary, and a continuously revolving driving shaft actuating said electrode and current controller.

29. In an electric metal working apparatus, the combination substantially as described, of a reciprocating electrode connected to the primary of a transformer, a driving shaft, mechanism connected with the same for moving the electrode in one direction, a spring or equivalent device for moving it in the opposite direction, and a circuit closer connected to the primary of the transformer and actuated by said driving shaft for closing the circuit of the primary in the interval between the forward movements of the electrode.

30. The combination in an electric metal working apparatus, of a reciprocatory clamp body C', a spring or equivalent device for moving the same in the direction to perform the desired operation upon the heated metal, a rotating shaft for moving the same in the opposite direction and periodically freeing it so that it may be acted upon by the spring, a transformer whose secondary supplies current to the work held by said clamp body, a circuit closer in the circuit of the primary, actuating devices for the same timed to close the circuit between the forward movements of the clamp body, a catch holding the same closed, and a trip operating on the forward movement of the clamp, as and for the purpose described.

31. The combination in an electric metal working apparatus, of a work holder, means for supplying current to the work sustained by said holder, a reciprocating actuating mechanism for said holder, an intermittently acting feeder for feeding or bringing successive parts or pieces of the work into place in said holder, and a current controller for putting current onto the work when in position in the work holder.

32. The combination substantially as described, in an electric metal working apparatus, of a reciprocating work holder, or abutment C', actuated in one direction by a cam or equivalent device and in the other by a spring, an intermittently acting or step by step feeder for causing portions or pieces of the work to rest successively in position for operation, means for supplying an electric current to the work, and an intermittently operating current controller.

33. The combination in an electric metal working apparatus, of a work holder or abutment for operating on the heated work, a spring for acting on the same to upset, weld or otherwise act upon the work, a cam or equivalent device actuated from a pivoted driving shaft for permanently reversing the movement of the holder and then leaving it to the action of the spring, and an intermittently operating or step by step feeder for causing portions or pieces of work to rest successively in position on the work holder.

34. In an electric metal working apparatus, the combination with a sliding electrode or work holder, of means for supplying electric current thereto, a continuously revolving cam or other device for moving the same in one direction, a spring for moving it in the other direction, and an intermittently operating or step by step feeder for causing portions or pieces of work to rest successively in position on the work holder.

35. In an electric metal working apparatus, the combination substantially as described, of a work holder, a driving shaft P', mechanism for reciprocating said work holder from said power shaft, a current controller, an actuating cam therefor or similar device, also operated by said shaft, and an intermittently operating or step by step feeder for causing portions or pieces of work to rest successively in position on the work holder.

36. In an electric metal working apparatus, the combination of a reciprocatory work holder, means for supplying current thereto, a power shaft, a cam or equivalent device acting on the work holder through suitable devices, a current controller, an actuating device moving said controller periodically into position to cause current to flow to the work holder, an automatic trip for releasing the current controller when the work holder moves in a direction to act on the heated work, and an intermittently operating or step by step feeder for causing portions or pieces of work to rest successively in position with respect to said electrode.

37. In an electric metal working apparatus, the combination with a reciprocating electrode connected with a source of heating electric current, of a spring tending to move the same in one direction, mechanism for periodically moving the same in the opposite direction, a current controller, actuating mechanism for periodically setting the same, a dog or catch, a trip connected with the electrode for releasing said current controller when the electrode moves under the action of the spring, and an intermittently operating or step by step feeder for causing portions or pieces of work to rest successively in position with respect to said electrode.

38. The combination substantially as described, in an electric metal working apparatus, of a reciprocatory work holding electrode C', connected with a source of electric energy, a current controller, a catch for holding the same set, a trip moving with the electrode for releasing the same on forward movement of the electrode, a continuously operating driving shaft and connecting devices between the same and the electrode and current controller, whereby the electrode may be moved rearwardly and the current controller may be set to cause current to flow, and an intermittently operating or step by step feeder for causing portions or pieces of work to rest successively in position with respect to said electrode.

39. In an electric metal working apparatus, the combination of a reciprocatory work holder connected to a source of electric energy, a current controller, a revolving shaft, two cams thereon, mechanisms actuated by said cams and connected respectively with the work holder and current controller, and an intermittently operating or step by step feeder for causing portions or pieces of work to rest successively in position with respect to said electrode.

40. The combination in an electric metal working apparatus, of a reciprocatory electrode, a transformer whose secondary connects with the same, a current controller for periodically closing the circuit of the primary, a continuously revolving driving shaft actuating said electrode and current controller, and an intermittently operating or step by step feeder for causing portions or pieces of work to rest successively in position with respect to said electrode.

41. In an electric metal working apparatus, the combination substantially as described, of a reciprocating electrode connected to the primary of a transformer, a driving shaft, mechanism connected with the same for moving the electrode in one direction, a spring or equivalent device for moving it in the opposite direction, a circuit closer connected to the primary of the transformer and actuated by said driving shaft for closing the circuit of the primary in the interval between the forward movements of the electrode, and an intermittently operating or step by step feeder for causing portions or pieces of work to rest successively in position with respect to said electrode.

42. The combination in an electric metal working apparatus, of a reciprocatory clamp body C', a spring or equivalent device for moving the same in the direction to perform the desired operation upon the heated metal, a rotating shaft for moving the same in the opposite direction and periodically freeing it so that it may be acted upon by the spring, a transformer whose secondary supplies current to the work held by said clamp body, a circuit closer in the circuit of the primary, actuating devices for the same timed to close the circuit between the forward movements of the clamp body and a catch holding the same closed, a trip acting on the forward movement of the clamp, and an intermittently operating or step by step feeder for causing portions or pieces of work to rest successively in position on said clamp body.

43. The combination in an electric metal working apparatus, of a feeder, a work holder or abutment C, a current controller, and an actuating shaft P', provided with cams or similar devices for operating said devices in the order or combination hereinbefore described.

44. In an electric metal working apparatus, the combination substantially as described, of a reciprocating feeder, a reciprocating work holder or abutment C', means for supplying heating current to the work held thereby, a current controller for starting the flow of current when the work is in place, an actuating shaft, cams connected therewith, and intermediate mechanism between said cams and the feeder, work holder and controller, as and for the purpose described.

45. The combination in an electric metal working apparatus, of a reciprocating work holder or abutment operating on the heated work, a movable clamp jaw or block for holding the work in position, a current controller, a driving shaft, and mechanism actuated or controlled by the latter for operating said holder, clamp and current controller, as and for the purpose described.

46. The combination in an electric metal working apparatus, of a reciprocating work holder, means for supplying an electric current to the work engaging therewith, a reciprocating clamp jaw, a current controller, and an actuating mechanism for closing the jaw and then actuating the current controller to turn on the current.

47. The combination in an electric metal working apparatus, of a reciprocating work holder connected to a source of electric energy, a reciprocating clamp jaw or block, a driving shaft, and actuating mechanism driven thereby for setting and unsetting the clamp jaw and moving the work holder.

48. The combination in an electric metal working apparatus, of a work holder connected with a source of energy, a clamp jaw, mechanism operating on the same to alternately set and relieve the jaw, a current controller, and a driving shaft for actuating the controller and the mechanism which operates the clamp jaw.

49. In an electric metal working apparatus, the combination of a movable work holder, a clamping jaw or block for holding the work in position, a current controller, a driving shaft, and mechanism operated thereby for actuating said holder, jaw and current controller.

50. In an electric metal working apparatus, the combination of a work holder C', connected to a source of energy and operated in one direction by positive action from a driving power and in the other by a spring or other power, a movable clamp jaw or block, a current controller for putting on the current when the work is clamped, and a driving shaft for operating said jaw, holder and controller.

51. In an electric metal working apparatus, the combination of a movable work holder, a source of electric energy connected thereto, a spring for moving the same in a direction to effect the desired action upon the heated metal, a reversing mechanism, a clamp jaw or block, mechanism for setting and releasing the same, a current controller, a catch for holding the same, a driving shaft for operating said mechanisms, and a trip for releasing the current controller on the forward movement of the work holder.

52. The combination in an electric metal work apparatus, of a feeder, a pair of work holders, means for applying current to the same, clamp jaws or blocks for fastening the work, a current controller for setting up the flow of current to said holders when the work is clamped, a driving shaft connected with the feeder, clamp jaws, and a cam for actuating the same, as and for the purpose described.

53. The combination in an electric metal working apparatus, of a pair of work holders forming terminals of a source of electric energy, a feeder for causing parts or portions of the work to rest successively in position on said holders, movable clamp jaws or blocks for holding the work when in position and releasing it, a current controller for causing current to flow when the work is in position, and a driving shaft for actuating said feeder, jaws, and current controller, as and for the purpose described.

54. In an electric metal working apparatus, the combination of a pair of work holders forming terminals of the secondary for a transformer, a feeder for feeding parts or portions of the work successively into position between them, reciprocating clamp jaws or blocks mounted in movable supports, mechanism for raising and lowering the same, a current controller in the primary of the transformer, and a driving shaft for operating said current controller, feeder and clamp actuating devices, as and for the purpose described.

55. In an electric metal working apparatus, the combination of a pair of work holders, a transformer whose secondary supplies the current for heating the work between said holders, a feeder for feeding the work into position between the work holders, reciprocating clamp jaws or blocks, a circuit closer in the circuit of the primary, a driving shaft for actuating said feeder, and jaws, and a trip device for releasing the circuit closer automatically on the completion of each metal working operation.

56. In an electric metal working apparatus, of work holders one movable to and from the other, means for supplying a heating current thereto, a feeder, movable clamp jaws or blocks, a current controller, a detent and a trip for the same, and a driving shaft for operating said feeder, clamps, and current controller, as and for the purpose described.

57. In an electric metal working apparatus, the combination of a feeder, a pair of work holders, means for supplying electric current to the same, mechanism for clamping the work in position between said work holders, a current controller, and a driving shaft for operating on said feeder, clamping mechanism and current controller.

58. In an electric metal working apparatus, the combination of a step by step feeder, an actuating cam therefor, a reciprocating electrode connected with a source of current, an actuating or controlling cam therefor, clamping mechanism for holding the work when fed into position in the circuit, an actuating cam for said mechanism, a driving shaft acting on said cams, and a current controller, as and for the purpose described.

59. In an electric metal working apparatus, the combination with the work holders, of means for supplying electric current to the work, a shifting or turning device for shifting the position of the work with relation to the same, and a feeder, as and for the purpose described.

60. In an electric metal working apparatus, the combination with the work holders for holding the work heated by the current, of means for moving one holder toward the other, and a rotary guide or guides arranged in line with said holders and adapted to turn in a plane transverse to the line of movement of the holders, as and for the purpose described.

61. In an electric metal working apparatus, the combination of the two work holding devices and the rotary guide all arranged in substantially the same straight line, the feeder feeding the work in a line joining said holding devices, and a driving shaft operating on said feeder and guides.

62. The combination in an electric metal working apparatus, of a feeder, a work holder or holders, a movable guide or guides, a current controller, and a driving shaft.

63. The combination in an electric metal working apparatus, of a feeder, a rotary guide or guides, a work holder or holders, a reciprocating clamping block or blocks, a current controller, and a driving shaft.

64. In an electric metal working apparatus, the combination of two work holders, a step by step feeder, and a chain guide all arranged in substantially the same straight line, and a common driving mechanism for moving the holders and operating the feeder and chain guides, as and for the purpose described.

65. The combination, substantially as described, in a chain welding machine, of a pair of work holders connected to a source of electric energy and one or both movable, of a step by step feeder, and a rotary chain guide or guides turning the work in a plane transverse to the line of movement of the holder.

66. The combination in an electric metal working apparatus, of a pair of work holders, movable one toward the other, of a chain guide or guides in line with the same, a step by step feeder, reciprocating clamp jaws or blocks, a current controller, and a driving shaft for operating said feeder, guide, holder and current controller, as and for the purpose described.

67. In an electric metal working apparatus, the combination substantially as described, of a pair of work holders connected to a source of electric energy and one or both movable, a step by step feeder, a reciprocating clamp jaw or jaws for said holders, a rotary chain guide or guides, a current controller, a driving shaft for actuating said parts, a catch for holding the current controller, and a trip therefor moving with the work holder.

68. The combination in an electric metal working apparatus, of a pair of holders each of which has a movable clamp jaw, of a chain guide having its opening with the line joining the said holders and capable of turning in a plane transverse to said line, means for moving one holder toward the other, and a common driving power for operating the chain guide, holders and clamp jaws in the order described.

69. In an electric metal working apparatus, the combination with a pair of work holders suitably constructed to hold the link of a chain between them, of a pair of chain guides arranged with their axes in a line parallel to the line joining the work holders rotatable for the purpose described.

70. In an electric metal working apparatus, the combination of work holders for holding the links of a chain, of a step by step feeder adapted to grasp the chain, a guide or guides having their axes parallel with the line joining the holders, and mechanism for rotating said guides and reciprocating the feeder, as and for the purpose described.

71. The combination in an electric metal working apparatus, of a pair of holders adapted to receive a chain link, and a turning chain guide or guides having a cruciform or equivalent interior and adapted to turn in a plane transverse to the line joining said holders.

72. In an electric metal working apparatus, the combination with the chain holding heating jaws, of a pair of feed jaws adapted to grasp the chain and mounted on feed levers, and a reciprocating slide connected to said levers, as and for the purpose described.

73. In an electric metal working apparatus, the combination with the rotary guide, of a slide reciprocating thereon and carrying pivoted feed jaws, and a second slide reciprocating parallel with the first and connected with suitable actuating mechanism.

74. In an electric metal working apparatus, the combination of a step by step feeder, a pair of chain links or holders, one or both movable, a turning guide or guides, reciprocating clamp jaws or blocks, a current controller, a spring connected to the movable holder, a driving mechanism for actuating the feeder, the link holder, guides, clamp jaws and current controller, and a trip connected with the movable holder for releasing the current controller all combined and operating as and for the purpose described.

75. In an electric metal working apparatus, the combination with a clamp jaw, of a toggle joint one member of which connects to the clamp jaw while the other engages a spring carried by the clamp body.

76. In an electric metal working apparatus, the combination of the clamp jaw, a toggle joint, spring engaging with toggle lever, a bar or rod connected to the center of the toggle for operating the same, and a cam for actuating said lever.

77. In an electric metal working apparatus, the combination of the clamp jaw, the slide carrying the same and working in a guide standard, the toggle lever guided on the same standard, a spring acting on the guide for said lever, and a second toggle lever connected to the clamp jaw, as and for the purpose described.

78. In an electric metal working apparatus, the combination with reciprocating work holders, of means for supplying electric current thereto, an actuating lever connected to said work holder, a spring tending to move said lever in one direction, and a cam $K^3$, and suitable intermediate mechanism for moving the lever in the opposite direction.

79. In an electric metal working apparatus, the combination with an actuator L, for operating on the heated work, of a spring tending to move the same in a direction to upset and shape the work, a cam $K^3$, and intermediate links and levers for moving said actuator in the opposite direction against the stress of the spring.

80. The combination in an electric metal working apparatus, of a current controller, a cam on a rotary shaft engaging with the same, a catch, a mechanical retractor for reversing the current controller, and a trip moving with the devices operating on or connected with the work.

81. The combination in an electric metal working apparatus, of a current controller, an actuating cam, a catch for the current controller, and a trip for engaging and releasing the catch, as and for the purpose described.

82. In an electric metal working apparatus, the combination of a step by step feeder, and an electric circuit for passing the heating current through the work after each feeding operation.

83. The combination in an electric metal working apparatus, of a step by step feeder, an electric circuit, and an automatic circuit changer.

84. The combination in an electric metal working apparatus, of two blocks or holders for acting upon the work and one movable with relation to the other, a step by step feeder for feeding the work into position with relation to the same, and an electric circuit for passing current through the work.

85. The combination of two work holders for receiving the work to be operated upon, a step by step feeder for feeding the material into position, an electric circuit for passing heating currents through the material, and an automatic circuit changer.

86. The combination substantially as described, in an electric metal working apparatus of a movable block C', for upsetting the work, a feeder for feeding the material step by step into position to be acted upon by said block, and means for heating the material to be worked.

87. The combination in an electric metal working apparatus, of electrodes for heating the material to be worked, means for intermittently reciprocating one of said electrodes, and a feeding mechanism for feeding the material intermittently into position between said electrodes.

88. The combination in an electric metal working apparatus, of a feeding mechanism, an upsetting mechanism, and means for passing an electric current into the work.

89. The combination in a metal working apparatus, of means for upsetting the material, electrodes for passing the heating current through the material, a step by step feed mechanism for feeding the material into position between the electrodes, and an automatic circuit changer for controlling the flow of the electric current.

90. In an electric metal working machine, the combination with the mechanism which operates upon the softened metal, of a source of heating electric currents, and a current controller connected with said mechanism and operated thereby automatically to apply the heating current intermittently to successive portions of the work.

Signed at Lynn this 30th day of December, A. D. 1890.

ELIHU THOMSON.
CHARLES E. HARTHAN.

Witnesses:
JOHN W. GIBBONEY,
BENJAMIN B. HULL.